(12) United States Patent
Tong et al.

(10) Patent No.: US 10,137,394 B2
(45) Date of Patent: Nov. 27, 2018

(54) INTERLACED FILTRATION BARRIER

(71) Applicant: Nano and Advanced Materials Institute Limited, Shatin, New Territories, Hong Kong (CN)

(72) Inventors: Ho Wang Tong, Hong Kong (CN); Sau Kuen Connie Kwok, Hong Kong (CN)

(73) Assignee: Nano and Advanced Materials Institute Ltd., Hong Kong (CN)

( * ) Notice: Subject to any disclaimer, the term of this patent is extended or adjusted under 35 U.S.C. 154(b) by 209 days.

(21) Appl. No.: 14/562,779

(22) Filed: Dec. 8, 2014

(65) Prior Publication Data

US 2015/0157971 A1 Jun. 11, 2015

Related U.S. Application Data

(60) Provisional application No. 61/963,612, filed on Dec. 9, 2013.

(51) Int. Cl.
*B01D 46/00* (2006.01)
*B01D 39/16* (2006.01)
(Continued)

(52) U.S. Cl.
CPC ..... *B01D 46/0001* (2013.01); *B01D 39/1623* (2013.01); *B01D 46/0023* (2013.01);
(Continued)

(58) Field of Classification Search
CPC ........ B01D 46/23; B01D 46/28; B01D 46/32; B01D 46/546; B01D 46/0028; B01D 2239/065; B01D 2239/025; B01D 2239/0435; B01D 46/0023; B01D 2239/0654; B01D 46/0001; B01D 2239/1233; B01D 39/1623; B01D 2239/0442; B01D 2239/0672; B01D 2239/064; B01D 2239/0631;
(Continued)

(56) References Cited

U.S. PATENT DOCUMENTS 7,044,993 B1    5/2006   Bolduc
8,303,693 B2   11/2012   Leung
(Continued)

FOREIGN PATENT DOCUMENTS

CN      2647352 Y       10/2004
GB      2404347          2/2005
WO      2012027242       3/2012

OTHER PUBLICATIONS

Tong, H.-W. and M. Wang, Negative voltage electrospinning and positive voltage electrospinning of tissue engineering scaffolds: a comparative study and charge retention on scaffolds. Nano Life, 2012. 2(1): p. 1250004.
(Continued)

*Primary Examiner* — Anthony R Shumate
(74) *Attorney, Agent, or Firm* — Eagle IP Limited; Jacqueline C. Lui (57) ABSTRACT

A filtration barrier comprises at least one barrier layer which includes polymeric nanofibers interlaced with microfibers, and at least one substrate layer which includes polymeric microfibers. The filtration barrier can be made by electrospinning process.

20 Claims, 9 Drawing Sheets

(51) Int. Cl.
| | |
|---|---|
| B01D 46/54 | (2006.01) |
| B29C 47/06 | (2006.01) |
| B29C 65/08 | (2006.01) |
| B29C 65/56 | (2006.01) |
| D01D 1/02 | (2006.01) |
| D01D 5/00 | (2006.01) |
| B29C 65/72 | (2006.01) |
| B29K 1/00 | (2006.01) |
| B29L 31/14 | (2006.01) |
| B29K 23/00 | (2006.01) |

(52) U.S. Cl.
CPC ..... *B01D 46/0028* (2013.01); *B01D 46/0032* (2013.01); *B01D 46/546* (2013.01); *B29C 47/06* (2013.01); *B29C 65/08* (2013.01); *B29C 65/565* (2013.01); *B29C 65/72* (2013.01); *D01D 1/02* (2013.01); *D01D 5/003* (2013.01); *D01D 5/0076* (2013.01); *B01D 2239/025* (2013.01); *B01D 2239/0435* (2013.01); *B01D 2239/0442* (2013.01); *B01D 2239/064* (2013.01); *B01D 2239/065* (2013.01); *B01D 2239/0631* (2013.01); *B01D 2239/0645* (2013.01); *B01D 2239/0654* (2013.01); *B01D 2239/0672* (2013.01); *B01D 2239/1233* (2013.01); *B29K 2001/00* (2013.01); *B29K 2001/12* (2013.01); *B29K 2023/10* (2013.01); *B29L 2031/14* (2013.01)

(58) Field of Classification Search
CPC .... B01D 46/0032; D01D 1/02; D01D 5/0076; D01D 5/003; B29L 2031/14; B29C 65/08; B29C 65/72; B29C 65/565; B29C 47/06; B29K 2001/12; B29K 2023/10; B29K 2001/00
See application file for complete search history.

(56) References Cited

U.S. PATENT DOCUMENTS

| | | | |
|---|---|---|---|
| 8,523,971 B2 | 9/2013 | Leung et al. | |
| 2004/0080083 A1* | 4/2004 | Czado | B01D 39/083 264/441 |
| 2008/0217807 A1* | 9/2008 | Lee | B01D 39/1623 264/172.18 |
| 2008/0264259 A1* | 10/2008 | Leung | B01D 39/1623 96/143 |
| 2009/0324680 A1* | 12/2009 | Reneker | A61L 31/042 424/423 |
| 2010/0175555 A1* | 7/2010 | Ferrer | D01F 6/80 95/273 |
| 2011/0174158 A1 | 7/2011 | Walls et al. | |
| 2011/0198282 A1* | 8/2011 | Chu | B01D 39/1615 210/500.29 |
| 2011/0232653 A1 | 9/2011 | Imashiro et al. | |
| 2011/0266213 A1 | 11/2011 | Jo et al. | |
| 2013/0180917 A1* | 7/2013 | Chu | A61K 31/74 210/634 |

OTHER PUBLICATIONS

Catalani, L.H., G. Collins, and M. Jaffe, Evidence for Molecular Orientation and Residual Charge in the Electrospinning of Poly(butylene terephthalate) Nanofibers. Macromolecules, 2007. 40(5): p. 1693-1697.

Borkow, G. and J. Gabbay (2004). "Putting copper into action: copper-impregnated products with potent biocidal activities." The FASEB Journal 18(14): 1728-1730.

Borkow, G., S. S. Zhou, et al. (2010). "A novel anti-influenza copper oxide containing respiratory face mask." PLoS One 5(6).

Chen, L., L. Bromberg, et al. (2008). "Electrospun cellulose acetate fibers containing chlorhexidine as a bactericide." Polymer 49(5): 1266-1275.

Fernandes, J. G., D. M. Correia, et al. (2014). "PHB-PEO electrospun fiber membranes containing chlorhexidine for drug delivery applications." Polymer Testing 34(0): 64-71.

Gabbay, J., J. Mishal, et al. (2006). "Copper oxide impregnated textiles with potent biocidal activities." Journal of Industrial Textiles 35: 323-335.

Gliscinska, E., B. Gutarowska, et al. (2013). "Electrospun Polyacrylonitrile Nanofibers Modified by Quaternary Ammonium Salts." Journal of Applied Polymer Science 128(1): 767-775.

Rengasamy, S., E. Fisher, et al. (2010). "Evaluation of the survivability of MS2 viral aerosols deposited on filtering face piece respirator samples incorporating antimicrobial technologies." American Journal of Infection Control 38(1): 9-17.

Bai, B. (2012). Electrospun chitosan nanofibers for virus removal. Chemical Engineering, Michigan Technological University.

Bhargava, S. (2007). Submicron size structures, electrospinning and filters, The University of Akron.

Bucher, T. M., H. V. Tafreshi, et al. (2013). "Modeling performance of thin fibrous coatings with orthogonally layered nanofibers for improved aerosol filtration." Powder Technology 249(0): 43-53.

Heikkila, P. (2008). Nanostructured fibre composites, and materials for air filtration.

Leung, W. W.-F. and C.-H. Hung (2008). "Investigation on pressure drop evolution of fibrous filter operating in aerodynamic slip regime under continuous loading of sub-micron aerosols." Separation and Purification Technology 63 (3): 691-700.

Leung, W. W.-F., C.-H. Hung, et al. (2009). "Experimental investigation on continuous filtration of sub-micron aerosol by filter composed of dual-layers including a nanofiber layer." Aerosol Science and Technology 43(12): 1174-1183.

Leung, W. W.-F., C.-H. Hung, et al. (2010). "Effect of face velocity, nanofiber packing density and thickness on filtration performance of filters with nanofibers coated on a substrate." Separation and Purification Technology 71(1): 30-37.

Li, J., F. Gao, et al. (2013). "Needleless electro-spun nanofibers used for filtration of small particles." eXPRESS Polymer Letters 7(8): 683-689.

Li, L., M. W. Frey, et al. (2006). "Modification of air filter media with nylon-6 nanofibers." Journal of Engineered Fibers and Fabrics 1(1): 1-22.

Qin, X.-H. and S.-Y. Wang (2006). "Filtration properties of electrospinning nanofibers." Journal of Applied Polymer Science 102(2): 1285-1290.

Qin, X.-H. and S.-Y. Wang (2008). "Electrospun nanofibers from crosslinked poly(vinyl alcohol) and its filtration efficiency." Journal of Applied Polymer Science 109(2): 951-956.

Schreuder-Gibson, H. and P. Gibson "Use of electrospun nanofibers for aerosol filtration in textile structures".

Wertz, J. "Nanofiber coating technology for filtration media".

* cited by examiner

INTERLACED FILTRATION BARRIER

CROSS-REFERENCE TO RELATED APPLICATION

This application claims benefit under 35 U.S.C. § 119(e) of U.S. Provisional Application having Ser. No. 61/963,612 filed on 9 Dec. 2013, which is hereby incorporated by reference herein in its entirety.

FIELD OF INVENTION

This invention relates to a polymer-based filtration barrier and a method of fabricating the same. In particular, the filtration barrier has a barrier layer and a substrate layer.

BACKGROUND OF INVENTION

A desirable filtration barrier should possess high filtration efficiency and low pressure drop. Some filtration barriers are made of meltblown fibers having diameters ranging from a few microns to a few tens of microns. Those barriers cannot effectively filter out most micron-sized particles and nanoparticles while maintaining a low pressure drop.

SUMMARY OF INVENTION

In the light of the foregoing background, it is an objective of the present invention to provide an alternate filtration barrier.

Accordingly, the present invention, in one aspect, provides a filtration barrier which includes at least one barrier layer and at least one substrate layer. The barrier layer includes a plurality of polymer-based nanofibers interlaced with a plurality of polymer-based microfibers. The substrate layer includes polymer-based microfibers. The barrier layer is attached onto the substrate layer. The nanofibers and/or microfibers of the barrier layer bear electrostatic charges.

In an exemplary embodiment of the present invention, the diameter of the polymer-based nanofibers of the barrier layer ranges from 10 nanometers to 1000 nanometers; the diameter of the polymer-based microfibers of the barrier layer ranges from 1 micron to 10 microns.

In another exemplary embodiment of the present invention, the filtration barrier further includes at least one supporting layer attached to the barrier layer, and the supporting layer includes polymer-based microfibers.

In another aspect, the invention provides a filtration barrier which includes a nanofiber layer and a biocide layer. The nanofiber layer includes a plurality of polymer-based nanofibers. The biocide layer includes a plurality of nanofibers made of polymers having reactive group and biocides which bind to the reactive group by crosslinker. The nanofiber layer is attached onto the biocide layer. The amount of biocide accounts for 0.5-2 weight percent in the biocide layer, and the range for the porosity of the biocide layer is 90-98%.

In a further aspect, the invention provides a method of fabricating a filtration barrier which includes the step of interlacing nanofibers with microfibers to form a barrier layer having a pore size of 100-10000 nm such that said filtration barrier can block more than 95% of particles of 200-400 nm at an air flow of less than 85 L/min, while maintaining a pressure drop of less than 35 mm $H_2O$. Particles of less than 200 nm can be blocked by Brownian diffusion while particles of more than 400 nm can be blocked by impaction, interception, electrostatic attraction and sieving.

In one embodiment, the above method further comprises a step of varying the conductivity, viscosity or surface tension of the polymer solution.

In a further embodiment, the above varying step further comprises the step of adding conductivity-enhancing additives.

In an exemplary embodiment of the present invention, the method further includes a step of attaching the interlaced barrier layer onto a substrate layer, and the substrate layer includes polymer-based microfibers.

In another exemplary embodiment of the present invention, the nanofibers and microfibers are made from a polymer solution and obtained by varying the conductivity, viscosity or surface tension of the polymer solution.

In a further aspect, the invention provides a method of fabricating a filtration barrier, which includes step (1) forming a barrier layer comprising nanofibers interlaced with microfibers by varying at least one dimension of a thread produced from a polymer solution; and (2) attaching the barrier layer onto a substrate layer to form the filtration barrier. The thread is produced by electrospinning with the polymer solution; and the substrate layer comprises a plurality of microfibers.

In a further aspect, the invention provides a method of fabricating a filtration barrier comprising a nanofiber layer and a biocide layer. The nanofiber layer includes a plurality of non-polar polymeric nanofibers bearing positive electrostatic charges. The biocide layer includes a plurality of nanofibers made of a polymer with a hydroxyl group that can covalently bind to a biocide with an amino group by a crosslinker.

The filtration barrier of the present invention provides a number of advantages, for example, the barrier layer includes an interlaced structure of nanofibers and microfibers in which additional support to the filtration barrier can be provided by the interlace without compromising the filtration efficiency of the filtration barrier. The inventors of the present invention appreciate the fact that although filtration efficiency generally increases with increasing nanofiber surface area, and that the surface area increases with decreasing nanofiber diameter, the nanofiber diameter cannot be reduced extensively without limit for a given material. If one needs to further increase the filtration efficiency of the barrier comprising nanofibers at a minimum possible diameter, one has to increase the thickness of the barrier, leading to an increase in pressure drop of the barrier. Therefore, the current invention is the solution to develop a filtration barrier capable of increasing filtration efficiency without causing significant increase in pressure drop.

The current inventors recognize that nanofibers fabricated via positive voltage and negative voltage electrospinning bear positive and negative electrostatic charges respectively and these charges can be retained for relatively long times. The current inventors also recognize that these charges come from two sources: residual surface charges and excess trapped charges (ETCs) in nanofibers. Unlike surface charges, ETCs do not dissipate easily as ETCs can accumulate at domain boundaries of a polymer. For semicrystalline polymers, charges can be trapped at crystalline/amorphous interface. Electrospun nanofibers made of non-polar polymers generally retain charges for a longer period of time when compared with those made of polar polymers. As most bacteria and viruses are negatively charged, the present solution to this problem is the formation of nanofibrous barriers bearing positive charges. Those charge-bearing barriers can enhance filtration of bacteria and viruses by electrostatic attraction without increasing pressure drop.

On the other hand, electrospun nanofibers can be functionalized with biocides capable of killing bacteria on contact while most commercially available filtration barriers merely serve as sieves to filter out airborne contaminants. An ideal barrier should exhibit bactericidal function in addition to physical blockage of airborne contaminants in order to minimize cross contamination. The inventors recognize that although some barriers can exhibit bactericidal property, those barriers often require leaching of biocides (e.g. silver nanoparticles) away from the barriers in order to kill bacteria. The present solution to develop a nanofibrous barrier capable of killing bacteria on contact without leaching biocides away from the barrier.

Besides, the filtration barrier has a higher filtration efficiency with lower pressure drop as illustrated in the results discussed below. Further, the barrier layer can be made by one set of solution, of which the conductivity, viscosity, and surface tension are unstable, so that the method of fabricating the barrier layer can be easily scaled up for large-scale production. Last but not least, the barrier layer, when attached to the substrate layer, can maintain its mechanical integrity. Yet, the filtration barrier comprising the substrate layer and the barrier layer is flexible such that roll-to-roll processing is allowed without affecting the mechanical integrity of the barrier layer.

DETAILED DESCRIPTION OF THE PREFERRED EMBODIMENTS

As used herein and in the claims, "comprising" means including the following elements but not excluding others.

Figure 1:
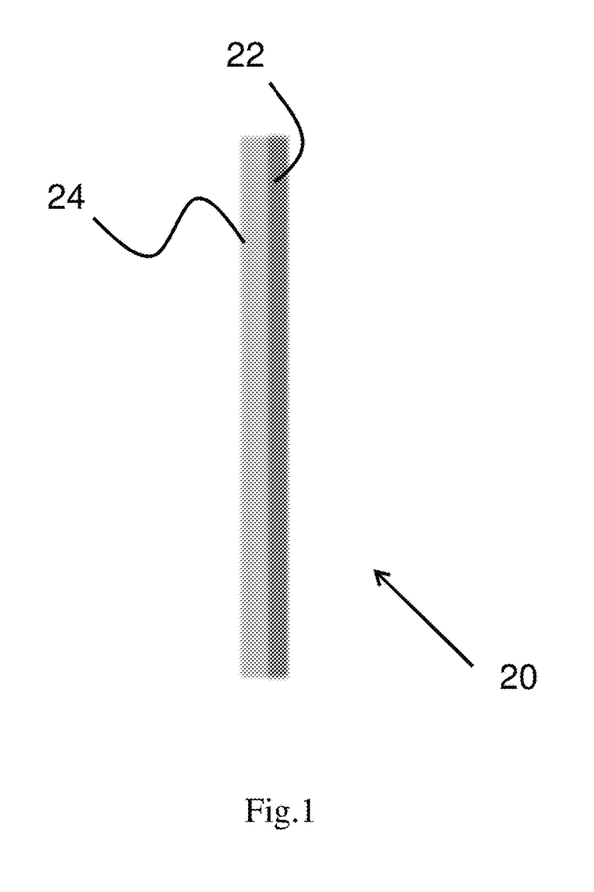
FIG. 1 illustrates a filtration barrier including a barrier layer and a substrate layer.

Example 1 Filtration Barrier Including Nanofibers Interlaced with Microfibers 1.1 Structure of the Filtration Barrier The first aspect of this invention, as shown in FIG. 1, relates to a filtration barrier 20 including a barrier layer 22 and a substrate layer 24. The barrier layer 22 includes an interlaced structure of polymer-based nanofibers and polymer-based microfibers in which nanofibers and microfibers bear electrostatic charges, whereas the substrate layer 24 is made of polymer-based microfibers. The barrier layer 22 is attached onto the substrate layer 24 via mechanical interlocking and electrostatic attraction.

In one embodiment, the perimeter of the barrier layer 22 can also be attached onto the perimeter of the substrate layer 24 via ultrasonic welding.

In one embodiment, the thickness of the barrier layer 22 ranges from 5 to 100 microns whereas the thickness of the substrate layer 24 ranges from 90 to 200 microns.

Figure 2:
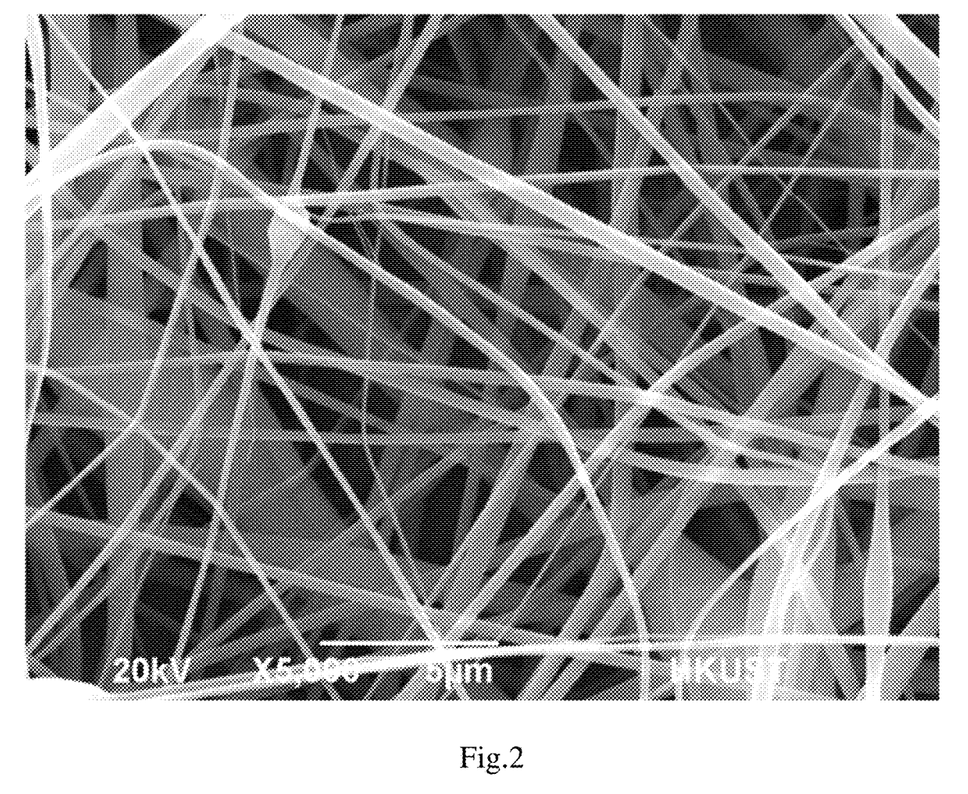
FIG. 2 illustrates the SEM image of CA/PEO nanofibers interlaced with microfibers (×5000 magnification) according to one embodiment of the present invention.

FIG. 2 shows the morphology of the interlaced structure of the barrier layer 22 under Scanning Electron Microscope (×5000 magnification). In one embodiment, the diameters of the nanofibers range from 20 to 500 nanometers while the diameters of the microfibers range from 1 to 3 microns.

Figure 3:
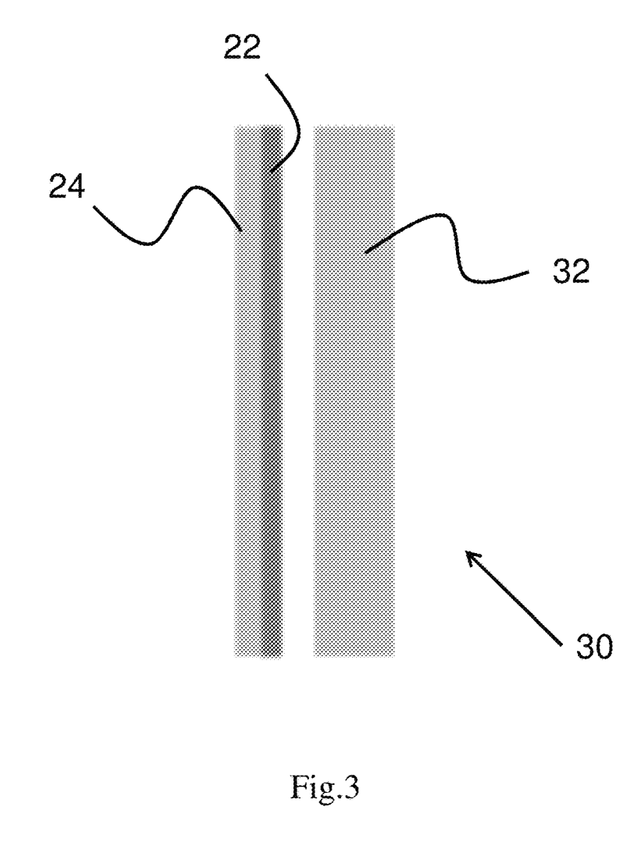
FIG. 3 illustrates a filtration barrier including a barrier layer, a substrate layer and a supporting layer according to the same embodiment of the present invention.

In another embodiment as shown in FIG. 3, the filtration barrier 30 further includes a supporting layer 32 attached to the barrier layer 22. The supporting layer 32 is made of polymer-based microfibers. In one embodiment, the supporting layer can be made of polyester, nylon, polyethylene, polyurethane, cellulose, polybutylene terephthalate, polycarbonate, polymethylpentene or polystyrene. In another embodiment, the diameter of the supporting layer ranges from 1 micron to 10 mircons.

In a specific embodiment, the barrier layer 22 of the filtration barrier 30 as shown in FIG. 3 is made of a combination of CA and PEO at a weight of 0.8 gsm in which both the nanofibers and microfibers are produced by electrospinning. Electrospinning, a technology capable of forming nanofibers/microfibers, is a promising approach to generate air filtration barriers having high filtration efficiency at low pressure drop. The substrate layer 24 is a nonwoven fabric made of 20 gsm polypropylene (PP) with antistatic treatment, in which the microfibers are produced by spunbonding or meltblowing. Lastly, the supporting layer 32 is a nonwoven fabric made of 50 gsm PP, in which the microfibers are also produced by spunbonding or meltblowing. Nonwoven mesh of nanofibers is a desirable material for filtration because of its high specific surface area. This property can facilitate trapping of tiny particles via various mechanisms such as sieving, interception and Brownian diffusion.

In one embodiment, the substrate layer is a nonwoven fabric made of 10-100 gsm polypropylene, and the supporting layer is a nonwoven fabric made of 40-120 gsm polypropylene.

Figure 4:
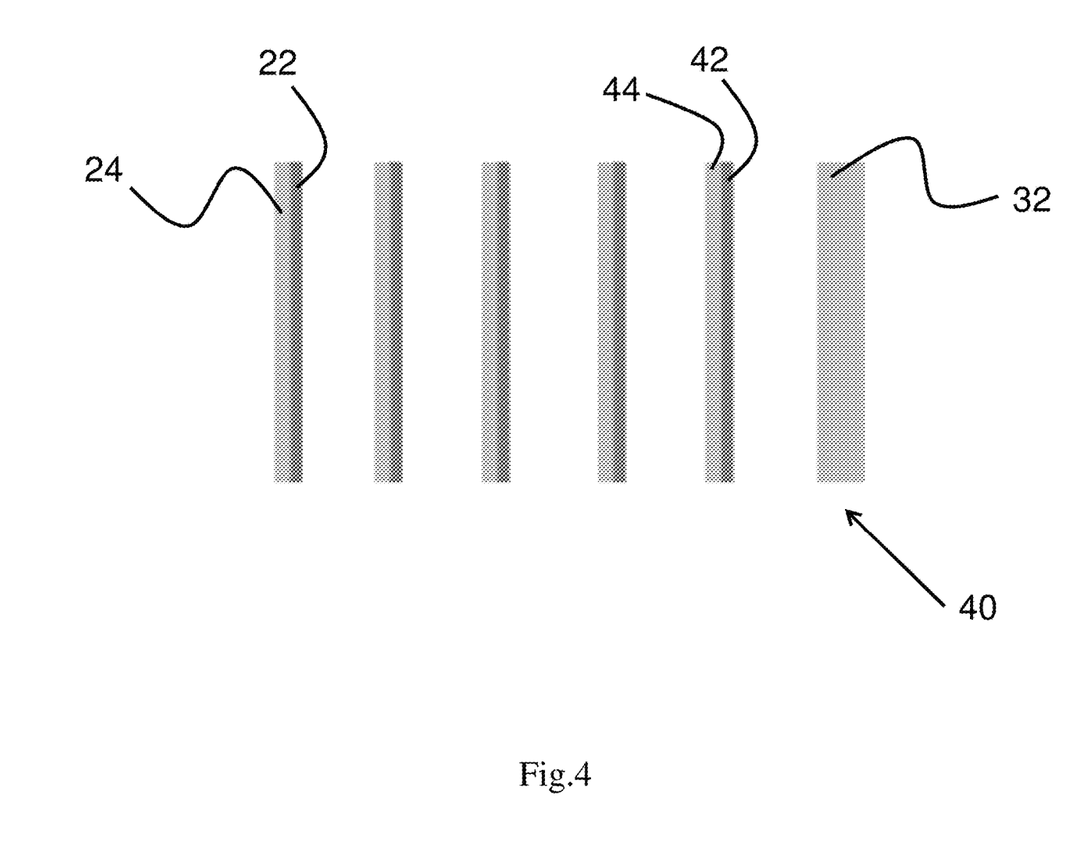
FIG. 4 illustrates a filtration barrier including five barrier layers and five substrate layers and one supporting layer according to one embodiment of the present invention.

In yet another embodiment, a filtration barrier can include multiple barrier layers and substrate layers. For instance, filtration barrier 40 as shown in FIG. 4 includes five barrier layers 22, five substrate layers 24 and one supporting layer 32, in which each of the five barrier layers 22 is attached onto one substrate layer 24, and one of the barrier layers 42 is sandwiched between a substrate layer 44 and the supporting layer 32.

1.2 Synthesis of the Filtration Barrier 15 wt % of cellulose acetate (CA) and 0.1 wt % of polyethylene oxide (PEO) were dissolved in dimethylformamide (DMF), and 0.3 wt % of benzyltriethylammonium chloride (BTEAC) was added to obtain a polymer solution.

The polymer solution was loaded into an electrospinning system in which electrospinning of the polymer solution was performed under the following conditions to form the barrier layer 22: coating time of 2 hr (with basis weight of 0.8 gsm), voltage at 25 kV, working distance of 15 cm, flow rate at 0.5 ml/h, needle ID at 0.8 mm, 23° C., and relative humidity of 60%. Drum collector was used for the electrospinning process.

In one embodiment, the working range of applied voltage is 10-50 kV; the working range of the distance is 10-30 cm; the working range of the solution flow rate is 0.05-5 ml/h; and the working range of the relative humidity is 30-80%, and the temperature is 20-30° C.

In one embodiment, the barrier layer formed has a pore size of 200 to 5000 nm such that more than 95% of particles of 10 to 800 nm cannot pass through the barrier while maintaining a pressure drop of 31 mm H2O when the air flow is 3 L/min.

The size or diameter of the CA/PEO fibers discharged from the electrospinner can be varied by adjusting the properties of the polymer solution, for example conductivity, viscosity and surface tension, during electrospinning. For instance, the size or diameter of the discharged fiber will be smaller if the conductivity of the polymer solution is increased, and the same effect can be observed if the viscosity of the polymer solution is decreased.

In order to make the properties of the polymer solution to be adjustable, a step of adding special conductivity-enhancing additives such as organic salts, inorganic salts, hygroscopic species or carbon black is included. Some examples of the additives are BTEAC, phosphorous acid ($H_3PO_4$), lithium chloride (LiCl), tetraethylammonium bromide (TEAB) and tetrabutylammonium bromide (TBAB). For example, to unstablize the conductivity of the polymer solution, 0.3 wt % of BTEAC is added to the polymer solution, such that the conductivity of the polymer solution is fluctuated within a range of 30-32 µS/cm.

The barrier layer produced by electrospinning is directly deposited onto a substrate layer made of polymer-based microfibers and the barrier layer is attached onto the substrate layer via mechanical interlocking and electrostatic attraction to form the filtration barrier. In one embodiment, a supporting layer made of polymer-based microfibers is attached to the barrier layer via ultrasonic welding to provide extra strength and support to the filtration barrier.

1.3 Study on the Filtration Efficiency and Pressure Drop of the Filtration Barrier The filtration efficiency and pressure drop on different numbers and/or different types of barrier layers synthesized in the aforementioned method were evaluated by passing particles with size ranging from 10-800 nm generated from an aerosol generator through the filtration barrier. An aerosol monitor was used at the other end of the filtration barrier to monitor the particles that can pass through.

Figure 5:
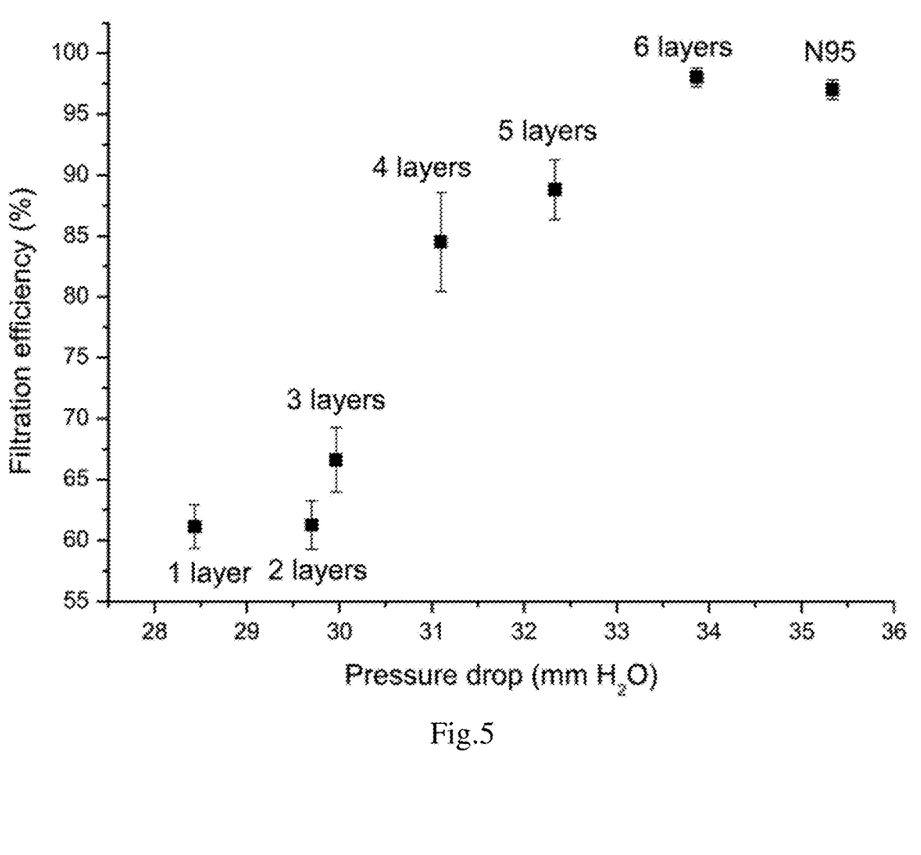
FIG. 5 illustrates the result of a study on filtration efficiency and pressure drop of the filtration barriers with different numbers of barrier layers and substrate layers. The barrier layer includes CA/PEO nanofibers interlaced with microfibers without electrostatic charges.

1.3.1 Barrier Layer Having the Interlaced Structure of Nanofibers and Microfibers with No Electrostatic Charge A shown in FIG. 5, the filtration efficiency and pressure drop of the different numbers of the barrier layers of the present invention synthesized by the aforementioned method, were compared. The barrier layer has nanofibers interlaced with microfibers at a weight of 0.8 gsm. The nanofibers interlaced with microfibers have no electrostatic charge. It can be seen that with the increase in the number of barrier layers, the filtration efficiency barrier layers both increase. N95, a very commonly used respirator which is able to filter 95% contaminants, is used as a control. As further observed, the sample with six barrier layers has a higher filtration efficiency, but yet a lower pressure drop than N95.

From the result, it can be seen that an enhanced filtration effect can be achieved using the barrier layer of the filtration barrier of the present invention. In particular, the filtration performance was better than that of N95 filter when six barrier layers were used.

1.3.2 Barrier Layer Having Nanofibers Only with No Electrostatic Charge

Figure 6:
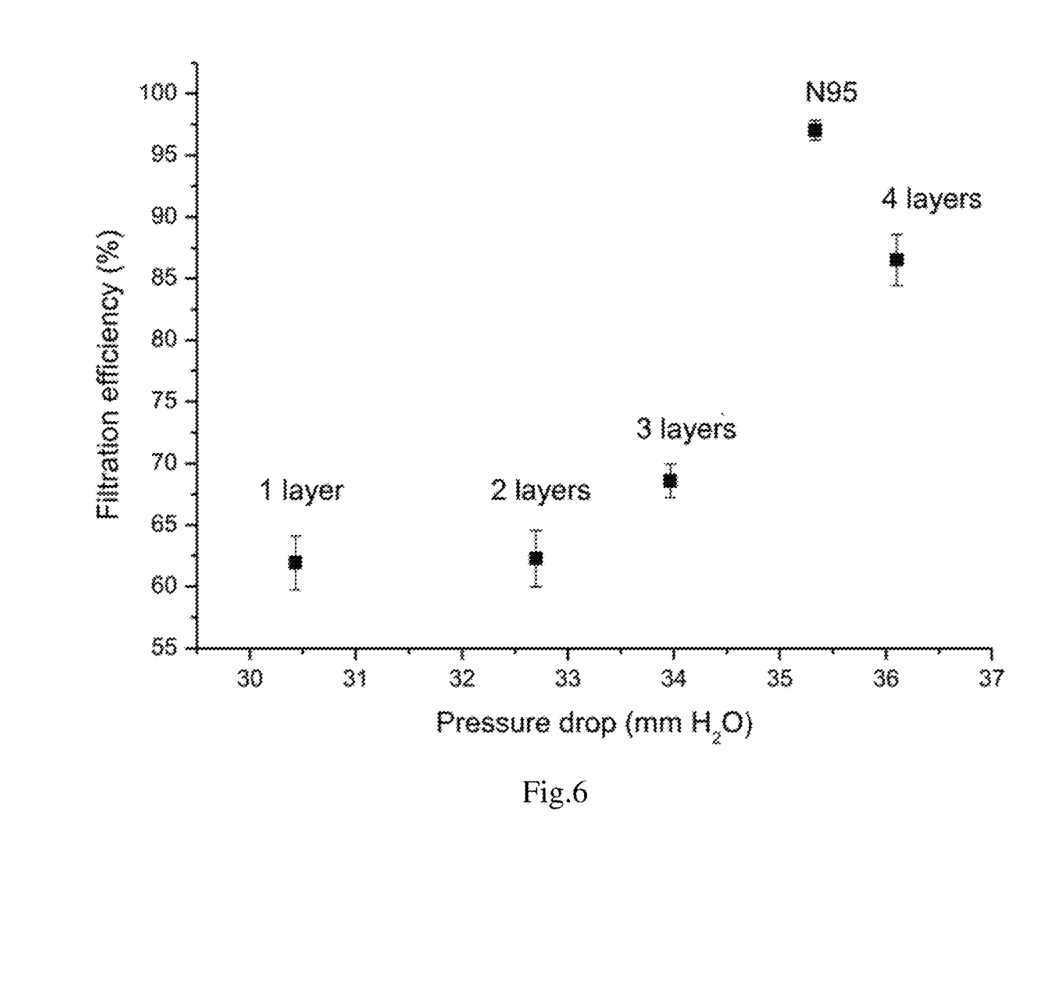
FIG. 6 illustrates the result of a study on filtration efficiency and pressure drop of different numbers of CA/PEO nanofiber layers.

FIG. 6 shows the filtration efficiency and pressure drop of a barrier layer having only the CA/PEO nanofibers (i.e. without interlace of CA/PEO nanofibers and CA/PEO microfibers) at a weight of 0.8 gsm with no electrostatic charge. On comparing the results shown in FIGS. 5 and 6, it can be seen that the pressure drop is reduced for barrier layer having the interlaced structure of the present invention as compared with that of the barrier layer without the interlaced structure.

Thus the result shows that barrier layer with the interlaced structure of the present invention could provide a lower pressure drop without compromising the filtration efficiency.

Figure 7:
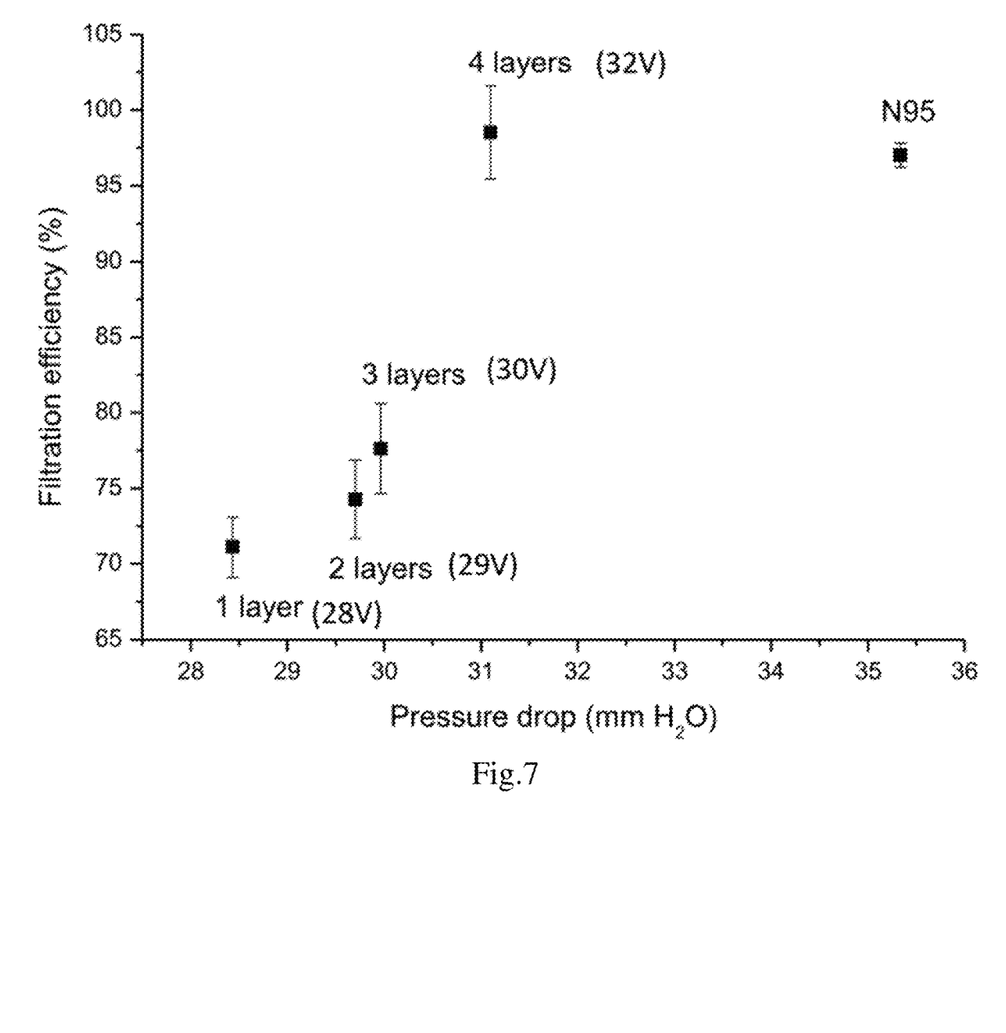
FIG. 7 illustrates the result of a study on filtration efficiency and pressure drop of the filtration barriers with different numbers of barrier layers and substrate layers. The barrier layer includes CA/PEO nanofibers interlaced with microfibers with electrostatic charges.

1.3.3 Barrier Layer Having the Interlaced Structure of Nanofibers and Microfibers with Electrostatic Charge In this study, the filtration efficiency and pressure drop of the different numbers of the barrier layers of the present invention (i.e. including interlace of nanofibers and microfibers) having electrostatic charge, synthesized by the aforementioned method, were evaluated and the result was shown in FIG. 7.

As shown in FIG. 7, the CA/PEO nanofibers interlaced with microfibers have electrostatic charges at a range of 28-32V which were produced by electrospinning process. On comparing the results shown in FIGS. 5 and 7, it can be seen that the barrier layer having electrostatic charge have a higher filtration efficiency than that of the barrier layer without electrostatic charges. Further, sample with four barrier layers with an electrostatic charge of 32V possessed a higher filtration efficiency and a lower pressure drop than N95.

Thus the result shows that electrostatic charges on the interlaced structure can increase the filtration efficiency without compromising the pressure drop.

Figure 8:
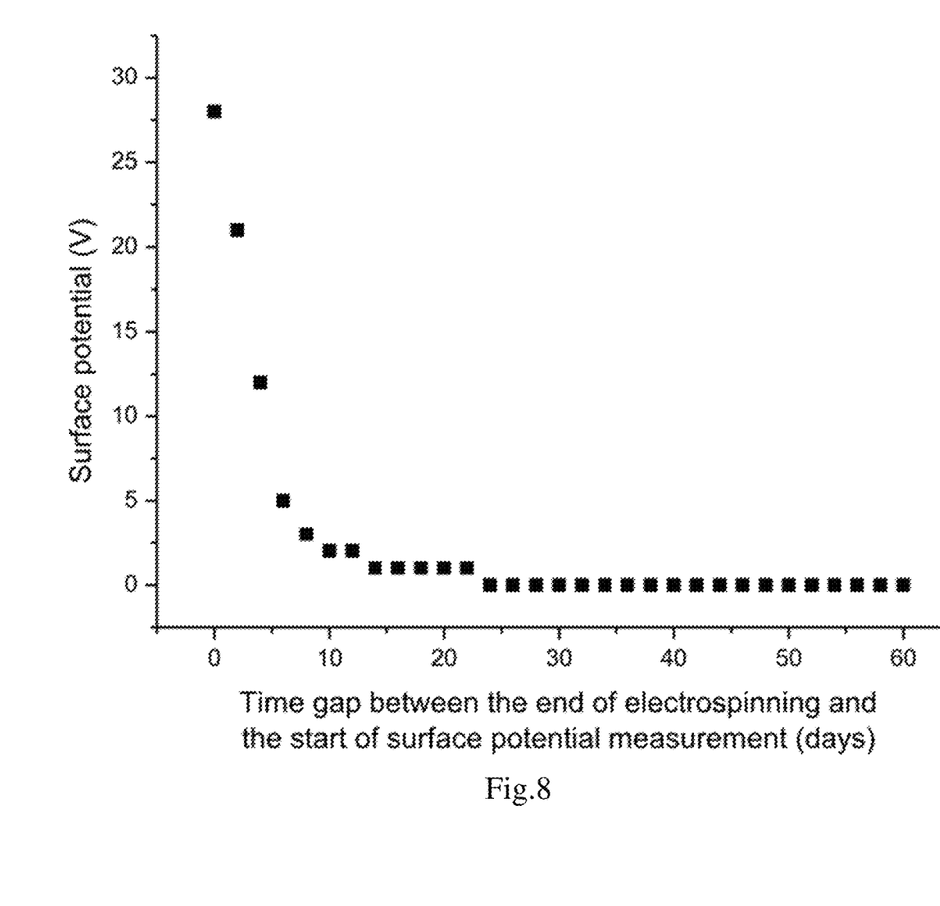
FIG. 8 illustrates the result of a study on surface potential of one barrier layer including CA/PEO nanofibers interlaced with microfibers over a period from the end of electrospinning to the start of measurement.
Figure 9:
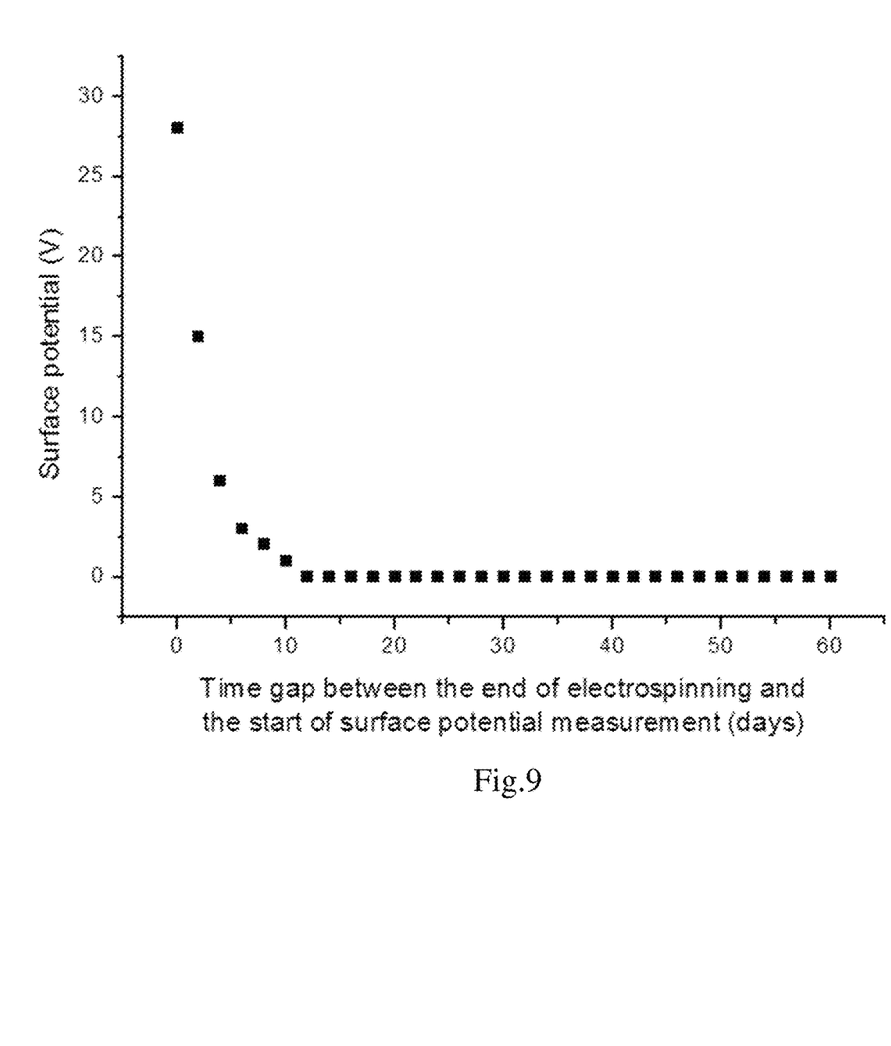
FIG. 9 illustrates the result of a study on surface potential of one barrier layer including CA/PEO nanofibers over a period from the end of electrospinning to the start of measurement.

Besides, the surface potential of one barrier layer of the present invention (i.e. having interlace of nanofibers and microfibers) at a weight of 0.8 gsm was measured by electrostatic voltmeter (TREK 706B). The surface potential was measured from the end of the electrospinning to 60 days afterwards and shown in FIG. 8. The surface potential was reduced to zero approximately 20 days after the end of the electrospinning, while as shown in FIG. 9 for barrier layer having CA/PEO nanofibers only, the surface potential was reduced to zero approximately 10 days after the end of electrospinning. Therefore, the result shows that the interlaced structure can maintain electrostatic charge for a longer time than the barrier layer having nanofibers only.

1.4 Electrospinning of Biocide-Loaded Nanofibers that are Interlaced with Microfibers 10 wt % of CA and 0.1 wt % of PEO were dissolved in DMF; 1 wt % of chlorhexidine (CHX) as biocide and 1 wt % of organic titanate (TTE) as cross-linker were added into the solution. The biocide-loaded solution was prepared into an interlaced structure of nanofibers and microfibers by electrospinning process as mentioned above. In one embodiment, the working range of the applied voltage is 10-50 kV; the working range of the distance is 10-30 cm and the working range of the solution flow rate is 0.1-3 ml/h.

The above example is given by way of illustration of the present invention but should not be considered to limit the scope of the invention. For example, the percent of CA and PEO and other components by weight in the solution is not limited to that in the above example. The polymer solution can include CA in the range of 10-20 by weight percent; PEO in the range of 0.05-0.2 by weight percent; benzyltriethylammonium chloride (BTEAC) in the range of 0.1-0.3 by weight percent, and DMF in the range of 80-90 by weight percent. Further, the polymer used to produce the interlaced structure of nanofibers and microfibers of the barrier layer is not limited to combination of CA and PEO. The polymer used can be collagen, elastin, gelatin, fibrinogen, fibrin, alginate, cellulose, silk fibroin, chitosan and chitin, hyaluronic acid, dextran, wheat gluten, polyhydroxyalkanoates, laminin, nylon, polyacrylic acid (PA), polycarbonate (PC), polybutylene terephthalate (PBT), polyurethane (PU), poly(ethylene vinyl acetate) (PEVA), polycaprolactone (PCL), polyglycolic acid (PGA), poly(lactic acid) (PLA), poly(lactic-co-glycolic acid) (PLGA), polyacrylonitrile (PAN), polystyrene (PS), polyvinyl alcohol (PVA), cellulose acetate (CA), polyethylene oxide (PEO) or any combination thereof. Also, the nanofibers and microfibers of the barrier layer can be made of non-polar polymers.

Although polypropylene (PP) is disclosed in the above example as ingredient for making the substrate layer and the supporting layer, it is clear to one skilled in the art that other polymers such as polyester, nylon, polyethylene, polyurethane, cellulose, polybutylene terephthalate, polycarbonate, polymethylpentene and polystyrene can also be used.

The filtration barrier may contain multiple barrier layers, substrate layers and supporting layers, and optionally biocide layer(s).

The percentages of nanofibers and microfibers by weight in the interlaced structure of nanofibers and microfibers account for 60%-70%, and 30%-40%, respectively. The range of porosity of the interlaced structure is 80-98%.

In a preferred embodiment, the nanofibers account for 65% by weight in the interlaced structure, and the microfibers account for 35% by weight in the interlaced structure.

The diameter of microfibers of the substrate layer and the supporting layer ranges from 0.002-0.02 mm and 0.005-0.05 mm respectively. The thickness of a single barrier layer, a single substrate layer and a single supporting layer ranges from 5-100 microns, 90-200 microns, and 150-400 microns, respectively.

The biocide used in the filtration barrier can be chlorhexidine (CHX), copper oxide, silver nanoparticles, calcium peroxide, N-halamines, and antibiotics. The cross-linker can be titanium triethanolamine, organic titanate, glutaraldehyde or genipin.

For the electrospinning process described above, the working conditions thereof include: applied voltage of 15-30 kV, working distance of 10-30 cm, solution flow rate at 0.1-5 ml/h, coating time of 0.5-5 hr. In addition, drum collector or plate collector can be used for the electrospinning process.

Example 2 A Filtration Barrier Including a Nanofiber Layer and a Biocide Layer In another aspect of this invention, a filtration barrier is described which includes two layers, nanofiber layer and biocide layer, attached to each other. The nanofiber layer is positioned distal to the air-flow direction and includes polymer-based nanofibers bearing positive electrostatic charge. The biocide layer is positioned proximal to the air-flow direction and includes polymer-based nanofibers crosslinked with biocides, in which a first reactive group in the polymer can covalently bind to a second reactive group of the biocide via a crosslinker.

In one embodiment, the nanofiber layer and biocide layer may further be attached to several fibrous layers.

On the biocide layer, trap particles can be trapped and kill bacteria can be killed on contact while with the presence of positive charges on the barrier layer, filtration of negatively charged particles such as most bacteria and viruses can be further facilitated. Positive voltage electrospinning is employed to make the nanofibers bearing positive electrostatic charges. The filtration barrier can be used for water filtration, provided that the polymer used does not disintegrate in water.

A method of fabricating a filtration barrier includes coating nanofiber layer onto biocide layer. Alternatively, the filtration barrier can be fabricated by first forming the barrier layer comprising positively charged nanofibers and the layer comprising biocide-crosslinked nanofibers separately, followed by assembling them together.

In one embodiment, the nanofiber layer was attached onto the biocide layer, which was made by electrospinning system. A CA/PEO solution was blended with CHX and TTE so that biocide-crosslinked nanofibers can be made via a one-step process. The biocide layer was used as a substrate to collect nanofibers bearing positive electrostatic charges which were made by electrospinning process.

In one embodiment, the percentage of CA by weight in the CA/PEO solution can be in the range of 10-20 by weight percent, and that of PEO can be 0.05-0.2 by weight percent.

In another embodiment, the nanofiber layer and the biocide layer were separately made by electrospinning. Both layers were assembled together to form a filtration barrier.

Multiple nanofiber layers and biocide layers can be assembled together to form a filtration barrier.

The nanofiber layer and the biocide layer can be assembled with other nonwoven layers including polypropylene meltblown microfibers.

The filtration barrier can filter out at least 95% of sodium chloride aerosol having the most penetrating particle size at an airflow rate of 85 L/min while the pressure drop does not exceed 35 mm water.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the polymer used to make the nanofiber layer or the biocide layer has the ability to retain residual charges for relatively long times. The polymer used in the nanofiber layer or in the biocide layer can be made of non-polar polymer; in another embodiment, the polymer can be collagen, elastin, gelatin, fibrinogen, fibrin, alginate, cellulose, silk fibroin, chitosan and chitin, hyaluronic acid, dextran, wheat gluten, polyhydroxyalkanoates, laminin, nylon, polyacrylic acid (PA), polycarbonate (PC), polybutylene terephthalate (PBT), polyurethane (PU), poly(ethylene vinyl acetate) (PEVA), polycaprolactone (PCL), polyglycolic acid (PGA), poly(lactic acid) (PLA), poly(lactic-co-glycolic acid) (PLGA), polyacrylonitrile (PAN), polystyrene (PS), polyvinyl alcohol (PVA), cellulose acetate (CA), polyethylene oxide (PEO) and combination thereof.

The filtration barrier may contain multiple nanofiber layers and biocide layers. The diameters of the nanofibers of the nanofiber layer range from 50-700 nm, and the diamaters of the nanofibers of the biocide layer range from 100-900 nm. The thickness of the nanofiber layer or the biocide layer is in the range of 5-100 microns.

In one embodiment, the nanofibers of the biocide layer exhibit an average diameter ranging of 50-900 nm. The thickness of the biocide layer and the nanofiber layer range of 100-500 mm. The nanofiber layer retains residual positive charges for a period of time ranging from 90 days to 1 year.

In the biocide layer, the first reactive group of the polymer can be hydroxyl group or amino group, whereas the second reactive group of the biocide can be an amino group or hydroxyl group.

Further, the biocide can be chlorhexidine (CHX), copper oxide, silver nanoparticles, calcium peroxide, N-halamines, or antibiotics, etc. The cross-linker can be used to bind the reactive groups of the biocide to the reactive groups of the polymer such that the biocide-crosslinked nanofibrous layer can kill bacteria on contact without leaching the biocide away from the polymer. The crosslinker can be titanium triethanolamine or organic titanate, etc.

For small-scale production of the nanofibers of both layers, a needle-electrospinning system can be used. For large-scale production of nanofibers, a needleless-electrospinning system can be used.

Further, for the fabrication of the biocide layer, no matter which electrospinning technique is employed, the biocide-crosslinked nanofibers can be made via a one-step process or a post-electrospinning treatment. For the one-step process, a polymer solution is blended with a biocide and a crosslinker so that biocide-crosslinked nanofibers can be electrospun in a single-step process. For the post-electrospinning treating, a polymer solution is electrospun into nanofibers first, followed by binding a crosslinker to the polymer and then binding a biocide to the crosslinker.

For the electrospinning process, the working conditions thereof include: applied voltage of 10-50 kV, working distance of 10-30 cm, solution flow rate at 0.1-5 ml/h.

What is claimed is:

1. A filtration barrier, comprising:
   at least one barrier layer that includes an interlaced structure that includes a plurality of first polymer-based nanofibers and a plurality of second polymer-based microfibers that are interlaced with the first polymer-based nanofibers in a same layer; and
   at least one substrate layer that includes a plurality of third polymer-based microfibers and that is attached onto the barrier layer,
   wherein the first polymer-based nanofibers and the second polymer-based microfibers that are interlaced with the first polymer-based nanofibers in the barrier layer both include a combination of cellulose acetate (CA) and polyethylene oxide (PEO), the first polymer-based nanofibers are electrospun nanofibers, the second polymer-based microfibers are electrospun microfibers, the first polymer-based nanofibers account for 60%-70% by weight of the barrier layer, and the interlaced structure of the barrier layer has a pore size of 100-10000 nanometers; and further wherein the first polymer-based nanofibers and the second polymer-based microfibers are made from a same polymer solution that includes the combination of the CA and the PEO, wherein the first polymer-based nanofibers and the second polymer-based microfibers are discharged together from the same polymer solution during electrospinning to form the interlaced structure.

2. The filtration barrier of claim 1, wherein the second polymer-based microfibers account for 30%-40% by weight of the barrier layer;
   and the barrier layer has a porosity of 80%-98%.

3. The filtration barrier of claim 1, wherein the CA and the PEO have a ratio of weight percentage as 50:1-400:1.

4. The filtration barrier of claim 1, wherein the first polymer-based nanofibers have a diameter of 10 nanometers to 1000 nanometers; the second polymer-based microfibers have a diameter of 1 micron to 10 microns.

5. The filtration barrier of claim 1, wherein the first polymer-based nanofibers and the second polymer-based microfibers bear positive electrostatic charges.

6. The filtration barrier of claim 1, wherein the third polymer-based microfibers include polypropylene.

7. The filtration barrier of claim 1, wherein the substrate layer is a nonwoven fabric made of 10-100 gsm polypropylene.

8. The filtration barrier of claim 1, wherein the barrier layer includes a combination of the CA and the PEO at a weight of 0.8 gsm.

9. The filtration barrier of claim 1 comprising:
   five barrier layers, five substrate layers and a supporting layer, wherein one of the five barrier layers is sandwiched between the supporting layer and one of the five substrate layers.

10. The filtration barrier of claim 1, wherein a supporting layer is attached to the barrier layer and the supporting layer is a nonwoven fabric made of 40-120 gsm polypropylene.

11. The filtration barrier of claim 1, wherein a supporting layer is attached to the barrier layer and includes polypropylene microfibers with a diameter of 1 micron to 10 microns.

12. The filtration barrier of claim 1 further comprising:
   a biocide that is crosslinked to the barrier layer, wherein the biocide is selected from a group consisting of chlorhexidine, copper oxide, silver nanoparticles, calcium peroxide, N-halamines, and antibiotics.

13. The filtration barrier of claim 1, wherein both of the first polymer-based nanofibers and the second polymer-based microfibers further include benzyltriethylammonium chloride.

14. A filtration barrier, comprising:
   a barrier layer that includes nanofibers that are interlaced with first microfibers in the barrier layer; and
   a substrate layer that is attached to the barrier layer and that includes second microfibers,
   wherein polymers of both the nanofibers and the first microfibers include a combination of cellulose acetate (CA) and polyethylene oxide (PEO), polymers of the second microfibers are selected from a group consisting of polyester, nylon, polyethylene, polyurethane, cellulose, polybutylene terephthalate, polycarbonate, polymethylpentene and polystyrene, the nanofibers account for 60%-70% by weight of the barrier layer, the nanofibers are electrospun nanofibers, and the first microfibers are electrospun microfibers, and the nanofibers and the first microfibers are interlaced such that the nanofibers cross over and under the microfibers to form the barrier layer having a pore size of 100-10000 nanometers.

15. The filtration barrier of claim 14, wherein the CA and the PEO have a ratio of weight percentage as 100:1 or 150:1.

16. The filtration barrier of claim 14, wherein a perimeter of the barrier layer is attached onto a perimeter of the substrate layer via ultrasonic welding.

17. The filtration barrier of claim 14, wherein the barrier layer has a thickness of 5 microns to 100 microns, and the substrate layer has a thickness of 90 microns to 200 microns.

18. The filtration barrier of claim 14, wherein the nanofibers have a diameter of 20 nanometers to 500 nanometers, and the first microfibers have a diameter of 1 microns to 3 microns.

19. A filtration barrier, comprising:
a barrier layer that includes a plurality of nanofibers that are interlaced with a plurality of microfibers in the barrier layer; and
a substrate layer that is attached to the barrier layer and that includes polypropylene,
wherein the nanofibers and the microfibers are made of a combination of cellulose acetate (CA) and polyethylene oxide (PEO), the barrier layer includes the combination of the CA and the PEO at a weight of 0.8 gsm, the nanofibers account for 60%-70% by weight of the barrier layer, the nanofibers are electrospun nanofibers, the microfibers are electrospun microfibers, and the nanofibers and the microfibers are interlaced to form the barrier layer having a pore size of 100-10000 nanometers.

20. The filtration barrier of claim 19, wherein the CA and the PEO have a ratio of weight percentage as 50:1-400:1.

* * * * *